March 10, 1964 R. L. ELSTON 3,124,028
AUTOMATIC MUSICAL INSTRUCTOR
Filed March 26, 1962 2 Sheets-Sheet 1
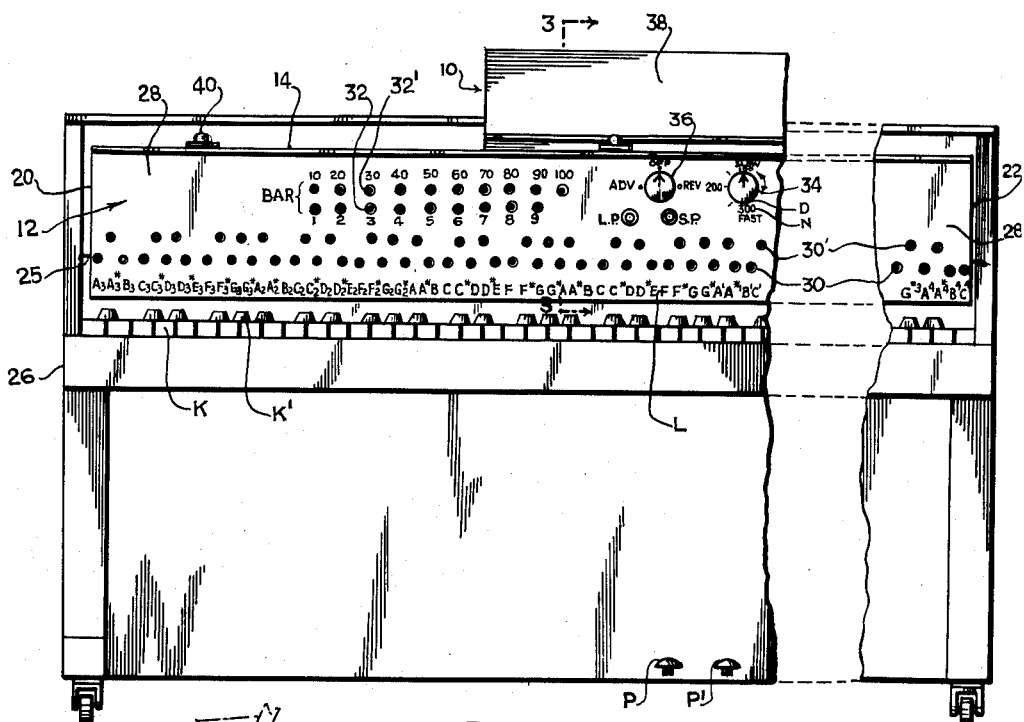
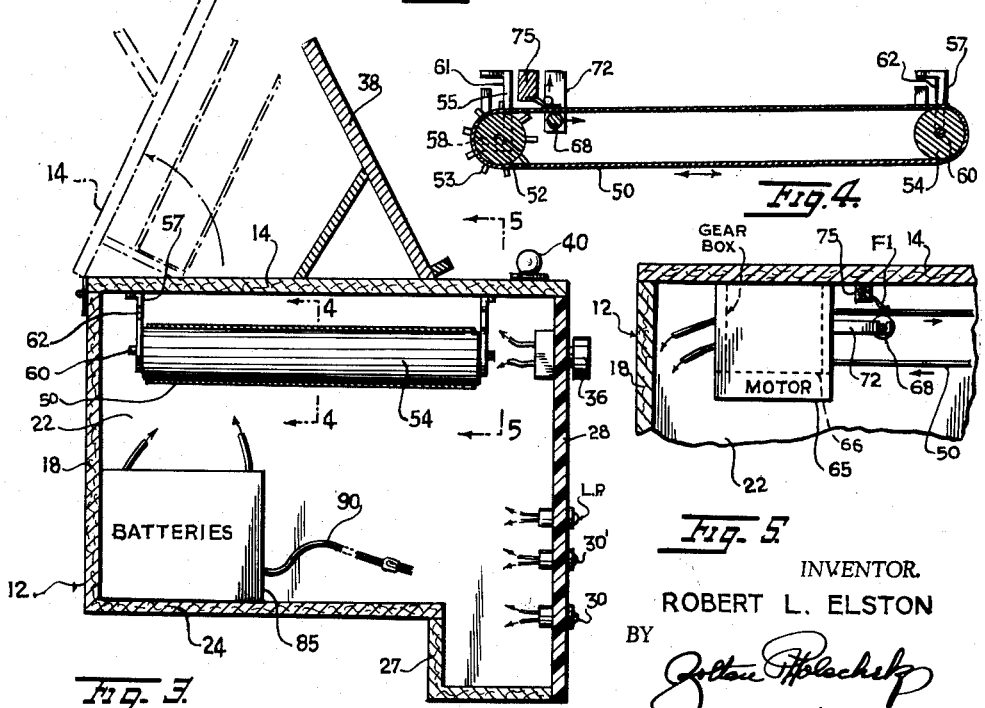
INVENTOR.
ROBERT L. ELSTON
BY
*Zoltan Holechek*
ATTORNEY

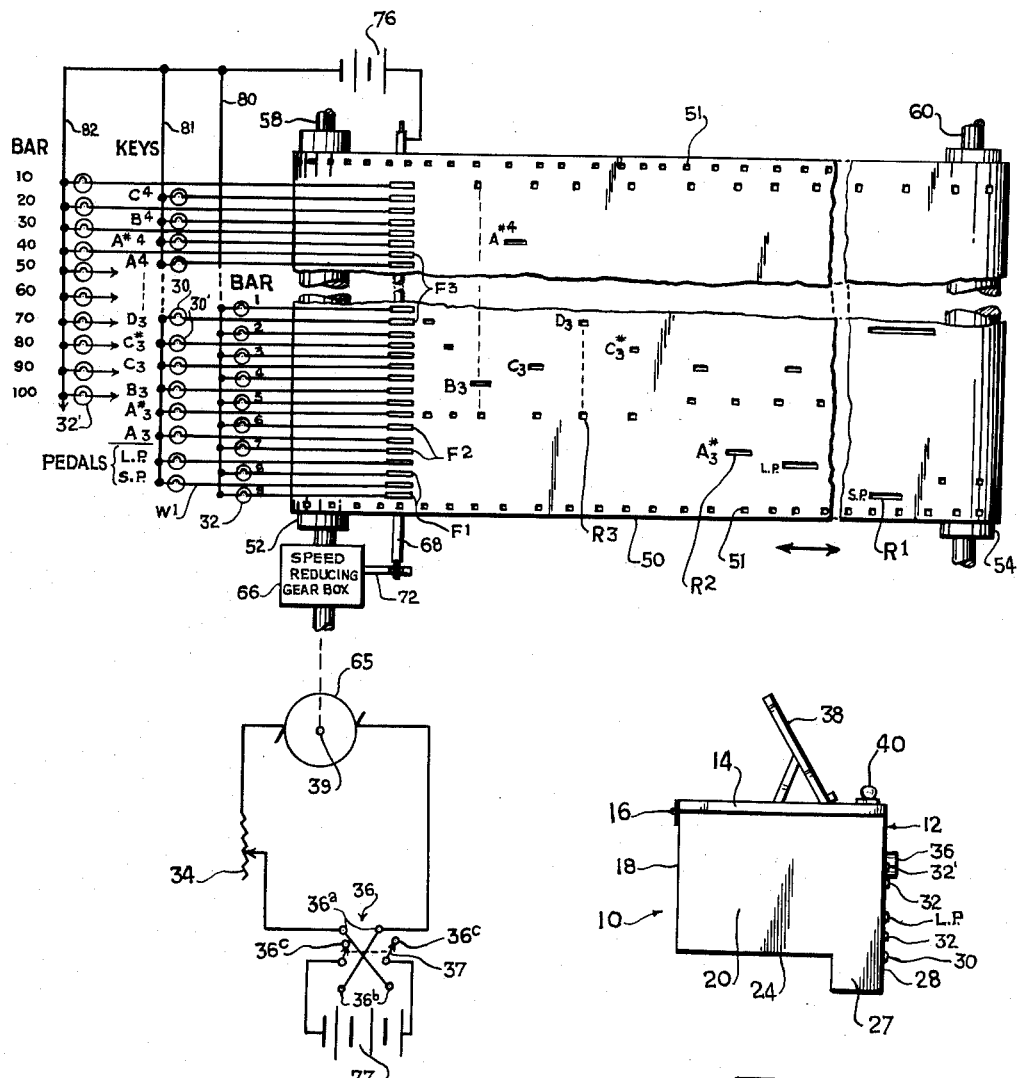

United States Patent Office 3,124,028
Patented Mar. 10, 1964

3,124,028
AUTOMATIC MUSICAL INSTRUCTOR
Robert L. Elston, 499 W. 130th St., New York, N.Y.
Filed Mar. 26, 1962, Ser. No. 182,494
4 Claims. (Cl. 84—473)

This invention concerns a device for teaching music, and particularly the playing of a piano or other musical instruments, such as wind, string or percussion instruments.

It has been proposed heretofore to provide a piano with an instruction apparatus including a series of lamps disposed adjacent to the keys. The lamps are connected in an electrical circuit in the apparatus. A punched card, chart, or magnetic tape or other type memory device with or without holes, which may be endless or discontinuous is movable in the apparatus so that each hole in the card or chart causes one of the lamps to light to indicate to a player which piano key is to be played. Of the various types of automatic piano instruction apparatus heretofore proposed none has proven entirely practicable.

The present invention is directed at overcoming the difficulties and disadvantages of the prior known automatic instruction devices for piano playing and at providing an improved instruction device which helps the player to the point where he can play a piece unaided and need not depend on the device for guidance.

A principal object of the invention is to provide a device which will impart the ability to read music, teach proper rhythm, repeatedly drill playing of difficult passages, teach pedal operation and guide the playing of music pieces until the student can play them independently of the device.

A further object is to provide a teaching device of the character described which is under the control of the player in which the player can control playing speed and repetition of difficult passages or the piece.

Still another object is to provide a teaching device of the character described wherein the player is provided with a continuous indication of the location in a piece of music of the particular bar or measure being played.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a front elevational view of a teaching device embodying the invention, shown mounted in operation position upon a piano, parts being broken away.

FIG. 2 is a side elevational view of the device.

FIG. 3 is a sectional view of the device on an enlarged scale taken on line 3—3 of FIG. 1.

FIG. 4 is a sectional view taken on line 4—4 of FIG. 3.

FIG. 5 is a sectional view taken on line 5—5 of FIG. 3.

FIG. 6 is a plan view of a coded music belt employed in the device, parts being broken away, with associated electrical components shown schematically.

Referring to FIG. 1 and 2, there is shown the teaching device 10 preferably housed in a cabinet 12 having a flat rectangular top 14 pivotally secured by a hinge 16 at the rear to a vertical rear wall 18. The cabinet includes end walls 20, 22 and a bottom wall 24 which rests on ledge 25 of the piano 26. The cabinet has a depending front portion 27 and rectangular front panel 28.

Panel 28 is vertically disposed over the keys K and K' of the piano. The panel is marked at its lower edge with letters L identifying the several keys with which the letters are aligned. Two horizontal rows of lamps 30, 30' are mounted on the panel. Lower lamps 30 are aligned with white keys K and upper lamps 30' are aligned with black keys K'. Two lamps marked L.P. and S.P. above lamps 30' near the center of the panel are employed for teaching operation of the loud or sustaining pedal P and the soft pedal P' respectively of the piano.

Near the top of panel 28 are two more horizontal rows of lamps 32, 32'. These lamps are provided for indicating 32 are identified by numerals one through nine, and lamps 32' are identified by numerals ten through one hundred in steps of ten. Near the top of the panel are rotatable knobs of two controls 34 and 36. On the top of the cabinet is a music stand 38 for supporting sheet music or a music book in open position. Knobs 40 on the top of the cabinet can be grasped for opening the top to expose parts mounted on the underside of the top 14 and inside the cabinet.

In FIGS. 3–6 is shown an endless music belt 50 which is mounted on a sprocket roller 52 and an idler roller 54 and travels continuously thereover. Holes 51 at edges of the belt are engaged by sprocket teeth 53. Roller 52 is supported on brackets 55 and roller 54 is supported on brackets 57 attached to the underside of cabinet top 14. The rollers have shafts 58, 60 supported in slots 61 and 62 of the respective brackets. The slots permit the rollers to be removed from the brackets for removing the belt and for replacing the belt with another. Roller 52 is driven by a motor 65 via a gear box 66. Both the motor and gear box are attached to the underside of top 14. An electrical contact bar 68 is removably supported at opposite ends in brackets 70, 72. Bracket 70 is attached to the underside of top 14 and bracket 72 is a slotted member supported by the gear box as indicated in FIGS. 5 and 6. Above bar 68 is an insulated bar 75 attached to top 14 and carrying a row of metal contact devices F1, F2 and F3. Wires W1, W2 and W3 connect the devices F1 to pedal indicating lamps L.P. and S.P., devices F2 to key indicating lamps 30, 30', and devices F3 to bar indicating lamps 32, 32'.

A battery 76 has one terminal connected to the bar 75 and the other terminal connected to the several lamps via wires 80, 81 and 82. Motor 65 is energized by a battery 77. In circuit with the battery 77 and motor 65 is control 34 for varying the speed of the motor and control 36 for stopping and starting the motor. The control 36 is a three-position, double-pole, reversing switch. In one position the poles 37 close with contacts 36ᵃ for starting and rotating the rotor 39 of the motor in one direction. In a second position the poles close with contacts 36ᵇ for reversing direction of rotation of the rotor. In a third position the poles are at contacts 36ᶜ and the motor is open circuited.

Belt 50 is made of paper or sheet plastic. A plurality of rows of holes R1, R2 and R3 are punched out of the belt lengthwise of its direction of travel. The holes are aligned with the contact devices F1, F2 and F3. Holes R1 are provided for lighting the pedal lamps L.P. and S.P. Holes R2 cause lighting of key indicating lamps 30, 30' and holes R3 cause lighting of bar indicating lamps 32, 32'. Batteries 76, 77 may be disposed in a container 85 in the cabinet.

In operation of the device, the belt is first mounted on the rollers 52, 54 and the first one of the key indicating holes R2 at the beginning of the piece of music represented by the coded holes is located directly under one of the contact fingers F2 connected to the key indicating lamp 30 or 30' corresponding to the particular key to be played. Aligned with this particular hole R2 transversely across the tape will be a hole R3 which will be located directly under one of fingers F3 connected to bar indicating lamp.

The belt is now set up for guiding playing of the first bar or measure of music. For each subsequent note of the first bar to be played, there will be an associated hole R3 aligned with the first hole R3 longitudinally of the belt. At the end of the holes R2 representing the first bar of music, a row of holes R3 will appear aligned with the contact finger F3 connected to bar indicating lamp 2. This row will extend as long as the several holes R2 representing the notes of the second bar of music. It will be apparent that for each row or group of key indicating holes R2 for each bar of music there will be a corresponding row of holes R3 representing the number of the bar being played. From the eleventh bar of music on, two parallel rows of holes R3 will appear except at bars numbered 20, 30 . . . 100. If the music has more than one hundred bars, depending on the length of the belt and closeness of spacing of the holes, then three rows of holes R2 will be provided.

The player now sets control 36 to one position to start the motor and advance the belt. Control 34 will initially be set at the point where the motor turns most slowly so that the belt travels most slowly. The several lamps 30, 30' will light up in turn as their electric circuits are completed through bar 68, fingers F2 and battery 76, over the keys K and K' to indicate to the player which keys of the piano are to be played.

Simultaneously lamps 32 and/or 32' will light to indicate to the player which bar of music is being played. A sheet of music or music book can be mounted on stand 38 and its several bars can be numbered to correspond with the lamps 32, 32'.

If the music requires operation of loud or soft pedals, holes R1 will appear under contact fingers F1 and lamp L.P or lamp S.P. will light. The player will depress pedal P or P' when its corresponding lamp lights. The belt moves continuously at slow speed until the player learns to play the piece of music at that speed. The device repeats the lighting of the several lamps over and over as the endless belt travels continuously around the rollers. If the player finds a particular music passage requires more practice, he operates control 36 to stop the motor and reverse the belt travel so that the belt moves back to the start of the passage to be repeated. Alternately, the player can set the control 34 to maximum advance speed and can then stop the belt by operating control 36 when the start of the difficult passage comes around to the contact devices. The lighting of bar indicating lamps 32, 32' always shows the player where the belt is oriented with respect to the contact fingers.

When the player is ready to start replaying of the difficult passage, he operates control 34 to set desired speed and control 36 to advance the belt. The device thus guides the player to practice playing a particular difficult passage over and over again. When the player has learned to play the music piece at one speed, he can increase the speed of travel of the belt and practice playing the piece at higher speed. If desired, the control 34 can be provided with a scale D marked on panel 28 with numbers N indicating in music beats per second the playing speed at which the control is set.

The control scale D will be calibrated accurately with the speed of movement of the belt. The sheet music can be marked with a number N indicating optimum playing speed. The player will thus be guided by successive settings of the control 34 at higher and higher speeds until he plays the piece at the speed N indicated on the printed music sheet and on scale D.

The invention guides a student to learn to play a piece of music with greater and greater facility until he commits the piece to memory and need no longer rely on the device to play the piece.

The device is shown as a self-contained apparatus which can be lifted off the piano and transferred to another one. If desired, a cable 90 shown in FIG. 3 may be provided to connect the batteries to an external power supply for recharging the batteries. Alternatively an external power supply can be substituted for the batteries.

It will be understood that electric or neon lamps may be used in the device. It will be noted that stand 38 will support printed sheet music in plain view of the player. When a group of lights 30, 30' representing a specific music chord light up, the printed chord on the sheet music is in plain view of the player. Furthermore, the specific bar being played may be indicated by a number printed on the sheet music and corresponding to the lighted lamps 32, 32' in plain view of the player.

While I have illustrated and described the preferred embodiment of my invention, it is to be understood that I do not limit myself to the precise construction herein disclosed and that various changes and modifications may be made within scope of the invention as defined in the appended claims.

Having thus described my invention, what I claim as new, and desire to secure by United States Letters Patent is:

1. A device for teaching playing of a musical instrument having a series of keys, comprising a cabinet shaped to seat upon the instrument, said cabinet having a front panel disposable vertically transversely across the keys, a first series of lamps on the panel disposed horizontally to align with the respective keys, a second series of lamps on the panel representing numerically successive bars of music to be played on the instrument, an endless belt in the cabinet, roller means removably mounting the belt for travel continuously in the direction of its length, motor means connected to the roller means to drive the same, said belt having two groups of rows of holes, sensing elements supported in the cabinet adjacent the belt and disposed in alignment with said rows of holes, a contact bar adjacent the belt contacting said elements with the belt disposed therebetween, and electrical means in circuit with the contact bar, sensing elements for lighting the lamps selectively as the belt travels in the direction of its length, the rows of holes in a first group thereof representing notes of a piece of music to be played on said instrument, the rows of holes of a second group thereof representing numerically successive bars of said music, at least one of the holes in the second group being aligned transversely across the belt with each one of the holes in the first group.

2. A device for teaching playing of a musical instrument having a series of keys, comprising a cabinet shaped to seat upon the instrument, said cabinet having a front panel disposable vertically transversely across the keys, a first series of lamps on the panel disposed horizontally to align with the respective keys, a second series of lamps on the panel representing numerically successive bars of music to be played on the instrument, a third series of lamps on the panel representing operating pedals of said instrument, an endless belt in the cabinet, roller means removably mounting the belt for travel continuously in the direction of its length, motor means connected to the roller means to drive the same, said belt having three groups of holes, sensing elements supported in the cabinet adjacent the belt and disposed in alignment with said rows of holes, a contact bar adjacent the belt contacting said elements with the belt disposed therebetween, and electrical means in circuit with the contact bar, sensing elements for lighting the lamps selectively as the belt travels in the direction of its length, the rows of holes in a first group thereof representing notes of a piece of music to be played on said instrument, the rows of holes of a second group thereof representing numerically successive bars of said music, at least one of the holes in the second group being aligned transversely across the belt with each one of the holes in the first group, the rows of holes in the third group of holes representing pedal operations, at least one of the holes in the third group of holes being aligned transversely across the tape with at least one hole in the first of said groups and with at least one hole in the second of said groups.

3. A device according to claim 2, further comprising a stand on said cabinet for holding sheet music in view of the player for reading and comparison with lighted lamps on said panel.

4. A device for teaching playing of a musical instrument having a series of keys, comprising a cabinet shaped to seat upon the instrument, said cabinet having a front panel disposable vertically transversely across the keys, a first series of lamps on the panel disposed horizontally to align with the respective keys, a second series of lamps on the panel representing numerically successive bars of music to be played on the instrument, an endless belt in the cabinet, roller means removably mounting the belt for travel continuously in the direction of its length, motor means connected to the roller means to drive the same, said belt having two groups of rows of holes, sensing elements supported in the cabinet adjacent the belt and disposed in alignment with said rows of holes, a contact bar adjacent the belt contacting said elements with the belt disposed therebetween, electrical means in circuit with the contact bar, sensing elements and lamps for lighting the lamps selectively as the belt travels in the direction of its length, a manually operable speed control carried by the panel and connected in circuit with the motor means for controlling speed of drive of the belt, and another manually operable drive control carried by the panel and connected in circuit with the motor means for controlling direction of drive of the belt, said speed control being provided with a scale calibrated to indicate speed of travel of the belt.

References Cited in the file of this patent

UNITED STATES PATENTS

| | | |
|---|---|---|
| 1,324,274 | Schantz | Dec. 9, 1919 |
| 1,324,277 | Schantz | Dec. 9, 1919 |
| 1,607,226 | Wood | Nov. 16, 1926 |
| 2,223,009 | Rupp et al. | Nov. 26, 1940 |
| 2,547,535 | Pierce et al. | Apr. 3, 1951 |

FOREIGN PATENTS

| | | |
|---|---|---|
| 529,927 | Germany | July 8, 1931 |